United States Patent

Hrabák et al.

[11] 4,039,735
[45] Aug. 2, 1977

[54] HOMOPOLYMERS AND COPOLYMERS OF TETRACHLOROETHOXYETHYL ESTERS AND METHOD FOR THEIR PREPARATION

[75] Inventors: František Hrabák; Karel Bochal, both of Prague, Czechoslovakia

[73] Assignee: Ceskoslovenska akademie ved, Prague, Czechoslovakia

[21] Appl. No.: 586,654

[22] Filed: June 13, 1975

Related U.S. Application Data

[62] Division of Ser. No. 427,224, Dec. 21, 1973.

[30] Foreign Application Priority Data

Dec. 28, 1972  Czechoslovakia .................. 9028/72
Dec. 28, 1972  Czechoslovakia .................. 9029/72

[51] Int. Cl.$^2$ .............. C08F 18/00; C08F 22/00; C08F 120/00; C08F 220/00
[52] U.S. Cl. ................... 526/292; 526/218; 526/224; 526/230
[58] Field of Search ........... 260/89.5 H, 80.7, 86.1 E, 260/83.5; 526/292, 218, 230, 224

[56] References Cited

U.S. PATENT DOCUMENTS

| 3,394,115 | 7/1968 | Sorkin | 260/89.5 H |
| 3,660,360 | 5/1972 | Ray-Chaudhuri et al. | 260/89.5 H |
| 3,882,169 | 5/1975 | Hrabak et al. | 260/89.5 H |

*Primary Examiner*—Joseph L. Schofer
*Assistant Examiner*—Herbert J. Lilling

[57] ABSTRACT

Homopolymers and mixed polymers of tetrachloroethoxyethyl esters, in particular of tetrachloroethoxyethyl acrylates and tetrachloroethoxyethyl methacrylates having the general formula

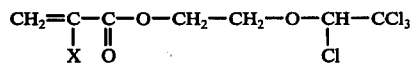

wherein X is a substituent selected from the group consisting of hydrogen and CH$_3$ radical. Homopolymers and mixed polymers of tetrachloroethoxyethyl esters with vinyl and/or diene compounds. Method for preparation of these homopolymers and mixed polymers.

21 Claims, No Drawings

HOMOPOLYMERS AND COPOLYMERS OF TETRACHLOROETHOXYETHYL ESTERS AND METHOD FOR THEIR PREPARATION

This is a divisional application of Ser. No. 427,224 filed on Dec. 21, 1973.

SUMMARY OF THE INVENTION

In accordance with the present invention, new chemical compounds are provided being homopolymers and mixed polymers of tetrachloroethoxyethyl esters having the general formula

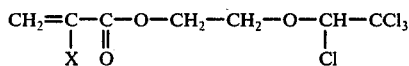

wherein X is a substituent selected from the group consisting of hydrogen and $CH_3$ radical. Also mixed polymers are provided comprising vinyl and/or diene compounds. The invention also provides a method for preparation of these homopolymers and mixed polymers.

DETAILED DESCRIPTION OF THE INVENTION

The invention relates to the formation of homopolymers and mixed polymers of tetrachloroethoxyethyl esters and particularly to tetrachlorowthlxyethyl acrylates and methacrylates of the general formula I

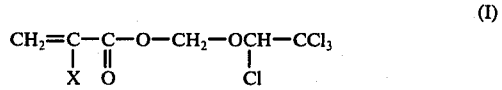

where X is a hydrogen atom or $CH_3$ radical and their homopolymers and, mixed polymers may be, especially combined with vinyl or diene compounds. The esters and compounds of the present invention were not known in the prior art. It has been found however that these new esters and compounds may be used as monomers or comonomers in the formation of a variety of forms to which other polymers have been used. The material is particularly resistant to combustion.

According to a further aspect of the present invention, the compounds of the general formula I are produced, by treating a compound of the general formula II

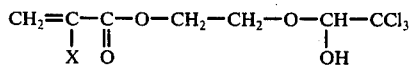

where X is a hydrogen atom or $CH_3$ radical with a thionyl chloride. The compound of formula II is an addition product of chloral and glycol monomethacrylate and glycol monoacrylate, respectively. Preferably n moles of the compound of the formula II are reacted with 0.5n to 2n moles of thionyl chloride.

The yield of this reaction is substantially increased in the presence of compounds able to bind the released hydrogen chloride, such as organic or inorganic bases, e.g. pyridine, triethylamine, and sodium carbonate.

To make the removal of the reaction heat easier, a solvent may be used which does not react with the starting components at all. Chloroform, ether, tetrachloromethane, are suitable. Also solvents which react only to a small extent with the starting compounds, e.g. benzene or toluene may be used.

Thionyl chloride and the compound of the general formula II may be used in an equimolar ratio, however an excess of 5 - 40% of thionyl chloride, related to the stoichiometric amount, is used as a rule to achieve a total substitution of hydroxy groups by chlorine in the compound of the general formula II.

The starting components are preferably mixed at a temperature within the range of $-10°$ to $+20°$ C. Stirring and cooling is maintained during mixing. The reaction is completed by heating the mixture to a higher temperature or to the boiling temperature.

The starting unsaturated compound of the general formula II may be stabilized, in the course of the reaction, by the addition in to the mixture of a radical polymerization inhibitor, for instance benzoquinone. The resulting product of the general formula I can be stabilized in the same way even afterwards.

The object of this invention is the production of homopolymers as well as mixed polymers of tetrachlorothomyethyl acrylates and methocrylates having the general formula I, where the ester of the general formula I or its mixture with other vinyl compounds of dienes may be polymerized by addition of a radical polymerization initiator and heated to the temperature, at which this initiator decays into free radicals. Solutions, aqueous emulsions or suspensions of the novel monomers can also to used in the polymerization, instead of pure monomers.

To start the polymerization of the above described esters, all conventional initiators or initiation systems used in radical polymerization of known monomers with unsaturated bonds may be used, as e.g. ditenaryl poromide and azobisisobutyronitrilo.

The polymerization temperature is chosen according to the character of initiator or initiation system used, to attain sufficiently rapid decomposition of the initiator into free radicals. Thus, for example, when the initiation redox system commonly used for emulsion polymerization is employed, the rate of the initiator decay becomes sufficiently high even In the temperature region from 0° to 30° C, while in the polymerization of unsaturated compounds in bulk, initiated by hydroperoxides, the polymerization mixture must be heated to 100°-120° C, before substantially decay occurs.

All vinyl and diene compounds can be used as comonomers of the esters having the general formula I, which proved their ability to homopolymerize or copolymerize with another unsaturated compound, namely with acrylic and methacrylic derivatives, by a free radical mechanism.

The method for producing tetrachloroethoxyethyl acrylate and methacrylate monomers and the method for their polymerization and copolymerization are illustrated in the followingg examples.

EXAMPLE I

Pyridine (75 ml) in 500 ml of diethyl ether and 65 ml of thionyl chloride are mixed while being stirred and cooled by an icewater bath in a flask provided with a mechanical stirrer, an reflux condenser and a dropping funnel. A solution of 220 g of crystalline 2(1-hydroxy-2,2,3-trichloroethoxy)ethyl methacrylate (m.p. 44°-45° C, prepared by the additiion of chlorol to glycol monomethacrylate) in 500 ml of diethyl other is slowly added to the mixture during continuous stirring and cooling. After all of the hydroxy compound has been added into the reactor, the reaction mixture is stirred and cooled for further 2 hours. It is then warmed to the temperature 20° C, the precipitated pyridine hydrochloride is filtered off and ether is removed by distillation. The distillation residue is heated in the presence of 20 g of powdered copper to the temperature 80° C at the pressure 15 Torr for 2 hrs and then it is rectified through an effective column. By a repeated fraction distillation, 180 g of 2-(1,2,2,2-tetrachloroethoxy)ethyl methacrylate was obtained, having b.p. 96°–97° C 0.1 Torr and refractive index $n_D^{25}$ 1.4900. Elemental analysis: found C, 32.20%; H, 3.58%; Cl, 47.35%; calculated C, 32.46%, H, 3.40%; Cl, 47.90%.

EXAMPLE 2

A solution of 12 g of thyionyl chloride in 50 ml of benzene is dropped from a dropping funnel into a mixture consisting of 30 g of 2-(1-hydroxy-2,2,2-trichloroethoxy)ethyl methacrylate, 12 g of triethylamine and 100 ml of benzene during the continuous stirring and cooling with ice-cold water. After thionyl chloride has been added, the mixture is stirred for 2 hours at the room temperature and the precipitated triethylamine hydrochloride is then filtered off. Hydroquinone is added (0.2 g) to the benzene filtrate and benzene is removed by distillation at the normal pressure. The residue is fractional distilled through a column in vacuo. The collected main fraction is 23 g of 2-(1,2,2,2-tetrachloroethoxy)ethyl methacrylate has bp.o. 107°–108° C/0.5 Torr and refractive index $n_D^{20}$ 1.4901.

Unsaturated monomers, esters of the general formula I, are non-flammable due to the high content of chlorine. Therefore, they can be used above all as monomers and comonomers for production of polymeric materials with suppressed combustibility.

EXAMPLE 3

A glass ampoula is charged with a solution of 0.06 g of 2,2'-azobisisobutyronitrile in 10 g of 2-(1,2,2,2-tetrachloroethoxy)-ethyl methacrylate (b.p. 96°–97° C/0.1 torr, $n_D^{25}$ 1.4900), cooled to −78° C, freed from air by an alternate evacuation and feeding with nitrogen, sealed, and then heated for 24 hrs. to the temperature 70° C. The resulting polymeric plug has a high adhesion to glass and is insoluble in benzene or chloroform. After extraction with ether, the polymer weighs 8.5 g; it is non-flammable, brittle, and has the density $d_4^{25}$ 1.48.

EXAMPLE 4

A mixture consisting of 5 g of 2-(1,2,2,2-tetrachloroethoxy)-ethyl methacrylate, 5 g of methyl meethacrylate, 40 ml of benzene, and 0.2 g of diisopropyl peroxodicarbonate is heated in a sealed ampoule, which was previously freed from air, for 12 hours to the temperature 25° C. The ampoule is then opened and the reaction mixture is poured into 200 ml of methanol. The precipitated polymer weighs 6.5 g after it has been dried— it is combusted in a flame of the gas burner, but it extinguishes outside the flame.

EXAMPLE 5

A glass ampoule is charged with 3 g of 2-(1,2,2,2-tetrachloroethoxy)ethyl methacrylate, 2 g of styrene, 2 g of butadiene, 0.03 g of dodecyl mercaptan, 0.024 g of potassium peroxodisulfate, 0.05 g of Mersolate, and 12 g of distilled water. The ampoule is freed of air, sealed, and fastened perpendicularly to a shaft which rotates by 30 r.p.m. In a thermostated bath heated to 50° C. After 6 hours, the latex is poured out from the ampoule into 150 ml of methanol acidified by hydrochloric acid. The precipitated polymer weighs 3.8 g. after it has been dried. It is soluble in benzene and self-extinguishing.

Homopolymers and mixed polymers of the compounds with the general formula I possess a suppressed flammability or are self-extinguishing. Therefore, they can find their application above all as non-flammable or low-flammable polymeric materials. According to their high adhesion to glass and metals, they may be also used as cements or binders with suppressed flammability.

We claim:

1. Solid homopolymers of tetrachloroethoxyethyl esters having the general formula

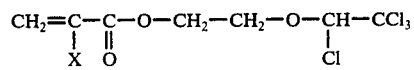

wherein X is a substituent selected from the group consisting of a hydrogen atom and $CH_3$ radical.

2. A method of producing solid homopolymers of tetrachloroethoxyethyl esters, having the general formula of claim 1, and solid copolymers of said esters with at least one of a vinyl or diene compound capable of copolymerizing with acrylic and methacrylic derivatives by a free radical mechanism, comprising the steps of adding a radical polymerization initiator to the ester of said general formula or to said ester and said vinyl or diene compound and initiating the polymerization by heating the mixture thus obtained to the temperature at which the polymerization initiator decomposes into free radicals.

3. The method in accordance with claim 2, comprising the step of admixing to the esters to be polymerized a vinyl compound.

4. The method in accordance with claim 2, comprising the step of admixing to the esters to be polymerized a diene compound.

5. The method in accordance with claim 2, wherein solutions of the monomers are used instead of pure monomers.

6. The method in accordance with claim 2, wherein aqueous emulsions of the monomers are used instead of pure monomers.

7. The method in accordance with claim 2, wherein suspensions of the monomers are used instead of pure monomers.

8. Solid copolymers of a tetrachloroethoxyethyl ester having the general formula

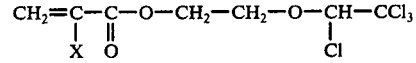

wherein X is a substituent selected from the group consisting of a hydrogen atom and $CH_3$ radical with at least one of a vinyl or diene compound capable of copolymerizing with acrylic and methacrylic derivatives by a free radical mechanism.

9. Copolymers of claim 8 in which said vinyl compound is methyl methacrylate.

10. Copolymers of claim 9 containing equal parts by weight of said ester and said vinyl compound.

11. Copolymers of claim 8 in which said vinyl compound is styrene.

12. Copolymers of claim 8 in which said diene compound is butadiene.

13. Copolymers of claim 8 in which said vinyl compound is styrene and said diene compound is butadiene.

14. Copolymers of claim 13 in which the ratio in parts by weight of said ester, said vinyl compound and said diene compound is 3:2:2.

15. The method in accordance with claim 2, comprising the step of admixing to the esters to be polymerized a vinyl compound and a diene compound.

16. The method in accordance with claim 3, in which said vinyl compound is methyl methacrylate.

17. The method in accordance with claim 16, in which equal parts by weight of said ester and said vinyl compound are present in said mixture.

18. The method in accordance with claim 3, in which said vinyl compound is styrene.

19. The method in accordance with claim 4, in which said diene compound is butadiene.

20. The method in accordance with claim 15, in which said vinyl compound is styrene and said diene compound is butadiene.

21. The method in accordance with claim 20, in which the ratio in parts by weight of said ester, said vinyl compound and said diene compound is 3:2:2.

* * * * *